(12) United States Patent
St. Jacques, Jr. et al.

(10) Patent No.: US 9,049,315 B2
(45) Date of Patent: Jun. 2, 2015

(54) METHOD, SYSTEM AND COMPUTER-USABLE MEDIUM FOR RANKING NETWORKED RENDERING DEVICES WITH VISUAL CUES

(75) Inventors: Robert J. St. Jacques, Jr., Fairport, NY (US); Douglas J. Tallinger, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 483 days.

(21) Appl. No.: 12/881,377

(22) Filed: Sep. 14, 2010

(65) Prior Publication Data

US 2012/0062912 A1 Mar. 15, 2012

(51) Int. Cl.
*G06F 3/12* (2006.01)
*H04N 1/00* (2006.01)
*H04N 1/32* (2006.01)

(52) U.S. Cl.
CPC .......... *H04N 1/00204* (2013.01); *G06F 3/1204* (2013.01); *G06F 3/1229* (2013.01); *G06F 3/126* (2013.01); *G06F 3/1285* (2013.01); *G06F 3/1292* (2013.01); *H04N 1/00236* (2013.01); *H04N 1/00278* (2013.01); *H04N 1/00413* (2013.01); *H04N 1/32529* (2013.01); *H04N 2201/0039* (2013.01); *H04N 2201/0082* (2013.01)

(58) Field of Classification Search
CPC ..... G06F 3/1229; G06F 3/126; G06F 3/1285; G06F 3/1292; H04N 2201/0037; H04N 2201/0072; H04N 2201/0034
USPC ........................................................ 358/1.15
See application file for complete search history.

(56) References Cited

U.S. PATENT DOCUMENTS

| | | | |
|---|---|---|---|
| 6,304,742 B1 | 10/2001 | Nunes et al. | 399/361 |
| 6,494,375 B1 | 12/2002 | Ishibashi et al. | 235/462.11 |
| 6,529,286 B1 | 3/2003 | King | 358/1.14 |
| 6,722,565 B2 | 4/2004 | Takeuchi et al. | 235/454 |
| 7,099,021 B2 | 8/2006 | Oyanagi | 358/1.13 |
| 7,333,224 B2 | 2/2008 | Gallacher | 358/1.15 |
| 7,648,072 B2 | 1/2010 | Yada | 235/462.09 |
| 7,689,436 B2 | 3/2010 | Howard | 705/1.1 |
| 7,710,589 B2 | 5/2010 | Sodeura et al. | 358/1.15 |
| 7,814,440 B2* | 10/2010 | Moon et al. | 715/864 |
| 2003/0011805 A1* | 1/2003 | Yacoub | 358/1.15 |

(Continued)

OTHER PUBLICATIONS

Intel(R) PROSet/Wireless WiFi Connection Utility User's Guide, 2008, Intel, pp. 1-50.*

(Continued)

*Primary Examiner* — Benny Q Tieu
*Assistant Examiner* — Quyen V Ngo
(74) *Attorney, Agent, or Firm* — Luis M. Ortiz; Kermit D. Lopez; Kevin Soules (57) ABSTRACT

A method, system and computer-usable medium for ranking a networked rendering device with one or more or a set of visual cues. A client device can be configured with a rendering application in order to select and transmit a rendering job along with one or more job criteria to a back end system. Each network rendering device having one or more print capabilities can be evaluated based on the job criteria in order to generate an 'overall ranking' utilizing the back end system. Sorting the rendering devices based on the 'overall ranking' can generate a ranked list. Such ranked list can be displayed in a user interface associated with the client device based on a set of visual cues in order to permit a user to select a best-fit rendering device in a simple and efficient manner.

15 Claims, 6 Drawing Sheets

(56) References Cited

U.S. PATENT DOCUMENTS

| | | |
|---|---|---|
| 2003/0133146 A1* | 7/2003 | Parry .......................... 358/1.15 |
| 2004/0137855 A1* | 7/2004 | Wiley et al. .................... 455/88 |
| 2007/0264991 A1* | 11/2007 | Jones et al. ................... 455/420 |
| 2008/0181187 A1* | 7/2008 | Scott et al. ................... 370/338 |
| 2008/0299927 A1* | 12/2008 | Tenbrook et al. .......... 455/226.2 |
| 2010/0188700 A1* | 7/2010 | Fujimori et al. ............. 358/1.15 |

OTHER PUBLICATIONS

Bees, Jonathan; Xerox ColorQube 9200: Poised for Market Disruption; May 7, 2009www.imagingstrategies.net.

Emigh, Jacqueline; Xerox Rolls Out Pioneering ColorQube Printer with Crayonlike Ink; May 7, 2009;www.betanews.com.

\* cited by examiner

METHOD, SYSTEM AND COMPUTER-USABLE MEDIUM FOR RANKING NETWORKED RENDERING DEVICES WITH VISUAL CUES

TECHNICAL FIELD

Embodiments are generally related to rendering devices such as, for example, printers, scanners, photocopy machines, multi-function devices and the like. Embodiments are additionally related to the ranking of rendering devices within a network.

BACKGROUND OF THE INVENTION

Networked rendering devices can interact with an assemblage of other rendering devices, client devices, servers, and other components that are connected to and communicate over a network. One example of a rendering device is an MFD (Multi-Function Device), which includes the functionality of multiple rendering devices such as printers, scanners, faxes, copy machines, and so forth. Each MFD in a network, for example, can include a variety of print capabilities options such as, finishing, media quality, supply levels and size. Such networked rendering devices can be communicatively linked with a client device in order to provide various operations such as, for example, printing, scanning, and other operations within the network.

Client devices such as, for example, personal computers, laptop computers, handheld computing devices such as mobile phones, and so forth can include a host application that permits a user to submit a rendering job and select a rendering device within the network. Such a host application decouples the process of submitting the rendering job from the selection of the rendering device.

Most prior art approaches for submitting and selecting a rendering job from a client device to a rendering device offer a list of available rendering devices within the network. The list can include details such as, for example, an installation order, an IP address, a MAC address, a DNS name, a device name, model, location, and status with respect to the networked rendering device, which may not be easily interpreted by a typical user. Such approaches are unable to sort the list according to user-required criteria. A list can be alternatively displayed with user-friendly names sorted according to the print job criteria and utilizing an algorithm. With this approach, however, it is difficult to identify a rendering device associated with appropriate print capabilities with respect to the rendering job.

Based on the foregoing, it is believed that a need exists for an improved system and method for ranking a networked rendering device with visual cues, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method, system and computer-usable medium for configuring a networked rendering device such as, for example, a printer, scanner, photocopy machine, fax machine, and/or an MFD.

It is another aspect of the disclosed embodiments to provide for an improved ranking method, system and computer-usable medium.

It is a further aspect of the disclosed embodiments to provide for a method, system, and computer-usable medium for ranking an MFD with one or more visual cues in order to indicate a best-fit networked MFD with respect to a rendering job.

The aforementioned aspects and other objectives and advantages can now be achieved as described herein. A method, system and computer-usable medium for ranking a networked rendering device (e.g., an MFD) with one or more visual cues (or a set of visual cues) are disclosed herein. A client device can be configured with a rendering application in order to select and transmit a rendering job along with one or more job criteria via, for example, a back end system. Each networked rendering device having one or more print capabilities (e.g., color, media type, finishing options, and proximity) can be evaluated based on the job criteria in order to generate an 'overall ranking'. Sorting the rendering devices based on the 'overall ranking' can generate a ranked list. Such ranked list can be displayed in a user interface associated with the client device based on a set of visual cues in order to permit a user to select a best-fit rendering device in a simple and efficient manner.

Some examples of visual cues with respect to the ranked list may include, for example, (but are not limited to) such concepts as a traffic light icon, cell phone bars, or other easily recognizable, intuitive symbols. A traffic icon includes one or more traffic lights (such as, green/red/yellow lights) for representing the print capabilities with respect to the rendering device based on the job criteria. Additionally, the overall ranking associated with the rendering device visually indicates a summary of the print capabilities. The ranked list can be optionally represented with a set of cell phone bars in order to indicate the compatibility between the rendering device and the rendering job in a mobile application where more bars indicate a stronger compatibility between the device and the rendering job, and fewer bars indicate weaker compatibility. The ranked list can be also displayed in a user interface associated with the rendering device for facilitating a print re-direction application in the network. A back end system can be employed, for example, to format and transmit the rendering job to the best-fit multifunction device via a web service print mechanism. Such an approach facilities the user to select the best-fit networked rendering device from the ranked list based on the job criteria.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
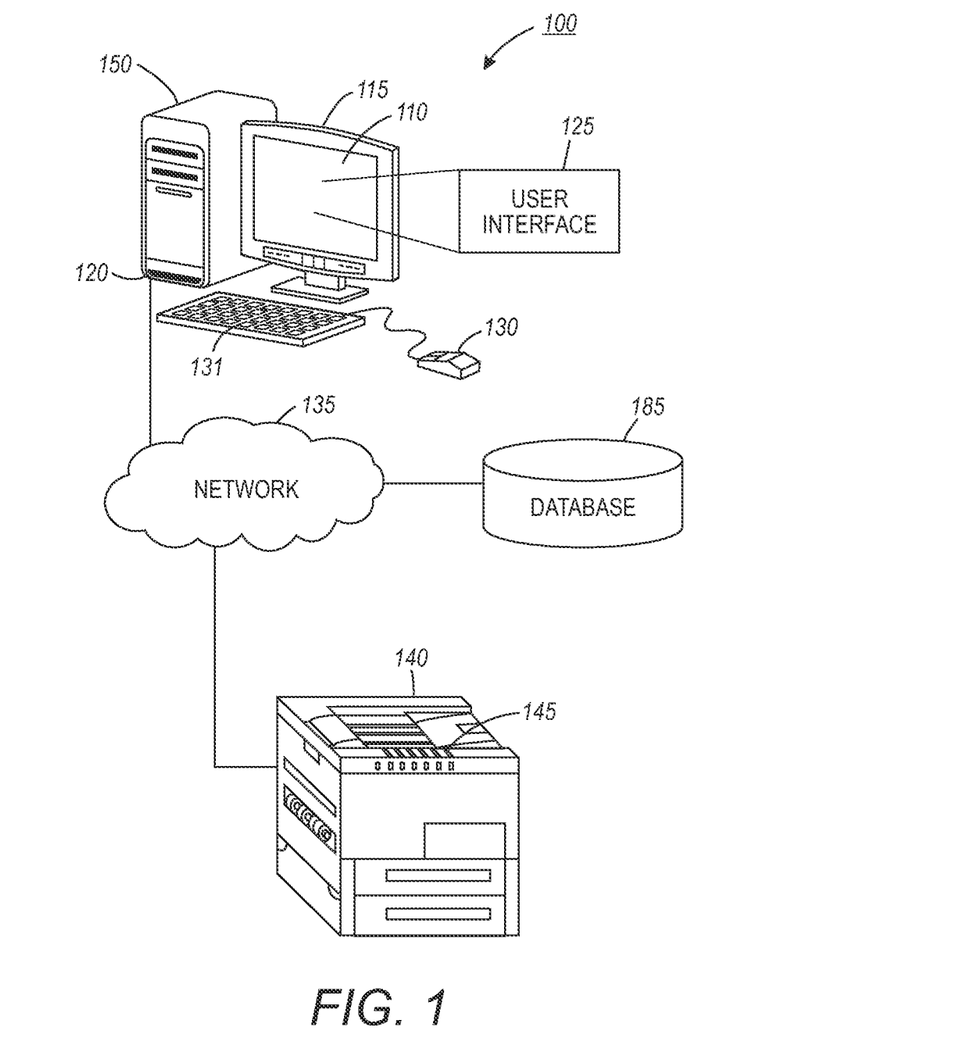
FIG. 1 illustrates an example of a rendering device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a rendering device 140 coupled to a data-processing apparatus 110 through a network 135. In some embodiments, rendering device 140 may be a rendering device such as a printer, scanner, copy machine, etc. In other embodiments, rendering device 140 may be an MFD. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140 may be included in association with the data-processing apparatus 110 as desired.

Figure 2:
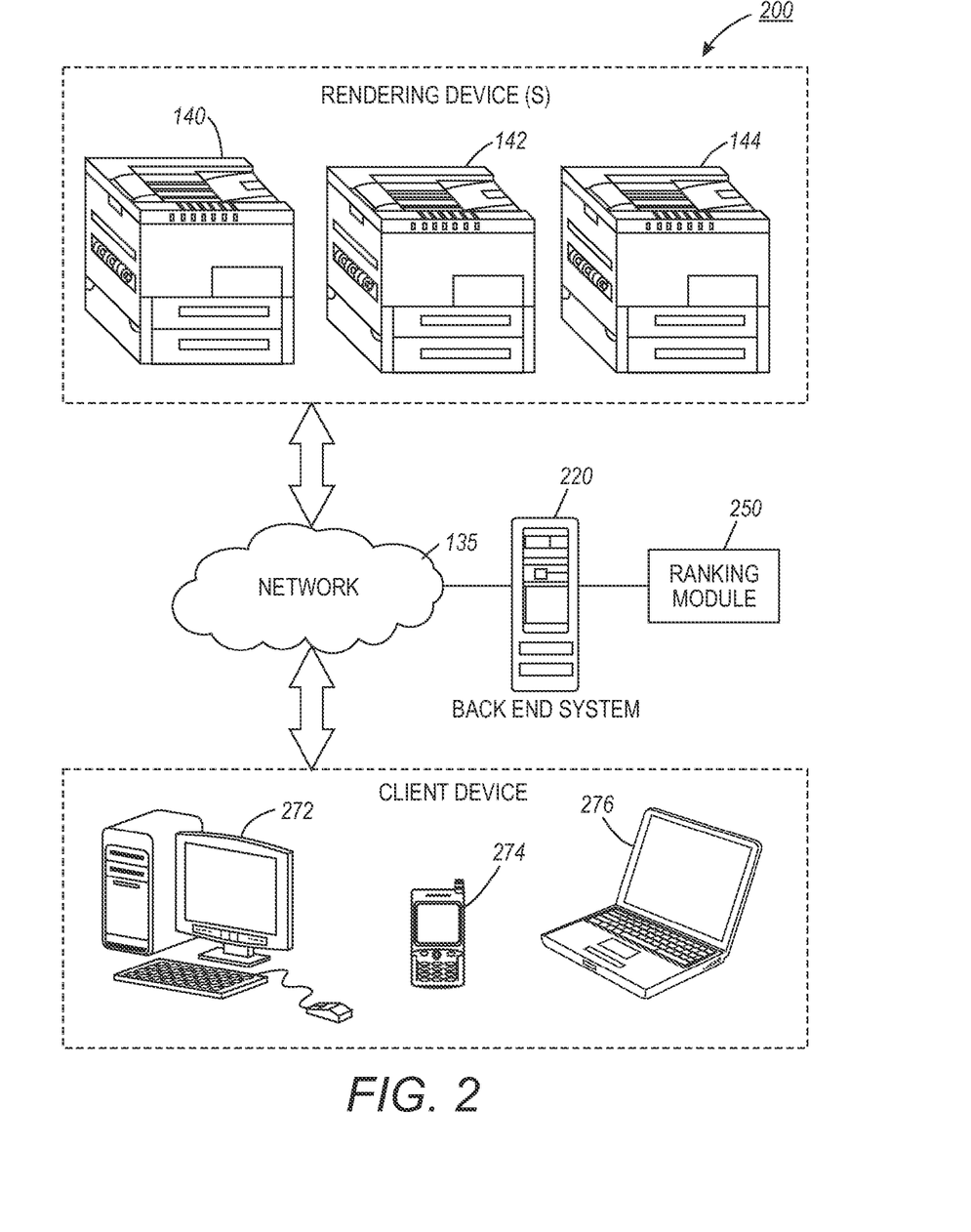
FIG. 2 illustrates a block diagram of a rendering device ranking system associated with various client devices and networked rendering devices, in accordance with the disclosed embodiments.

Note that as utilized herein, the term rendering device may refer to an apparatus or system such as a printer, scanner, fax machine, copy machine, etc., and/or a combination thereof (e.g., an MFD). Preferably, rendering device 140 is an MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying. Note that the rendering devices 142 and 144 illustrated herein with respect to FIG. 2 are generally analogous or similar to rendering device 140.

A non-limiting example of an MFD that can be utilized as rendering devices 140, 142 and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as rendering devices 140, 142 and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as rendering devices 140, 142 and/or 144 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The rendering device 140 includes a user interface 145, such as a panel menu. The panel menu may be used to select features and enter other data in the rendering device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the rendering device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and rendering device 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 2 illustrates a block diagram of a multi-function device ranking system 200 associated with various client devices and network-accessible devices, in accordance with the disclosed embodiments. The system 200 generally includes one or more rendering devices, such as, for example, devices 140, 142 and/or 144, which can provide one or more designated operations such as printing, scanning and/or device discovery operations. Rendering devices 140, 142 and/or 144 may each be, in some embodiments a distinct MFD. The system also includes one or more client devices 275 such as, for example, a personal computer 272, a laptop computer 276 or another computing apparatus or system 274 (e.g., wireless cellular telephone, Smartphone, etc) that are operatively configured in association with the network 135. The client device 275 communicates with the rendering device 140 through the computer network 135.

A back end system 220 can be configured in association with a ranking module 250 for providing a ranked list of multi-function devices 140 based on a rendering job. Note that the back end system 220 can be, for example, a server, a cloud-based web service, a peer on the network 135, or the client device itself (which may discover the rendering devices, query their capabilities, and generate a ranked list). The back end system 220 can be utilized to transmit the rendering job along with one or more job criteria from the client device 275 to the rendering device 140. The back end system 220 provides data, such as boot files, operating system images, and applications to the client device 275. Specifically, clients may connect to any member of a network of back end system 220, which provides equivalent content. In the depicted example, the back end system 220 connects to and communicates with the network 135 along with the ranking module 250.

Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as hard disk drives, USB drives, Flash Drives, DVDs, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
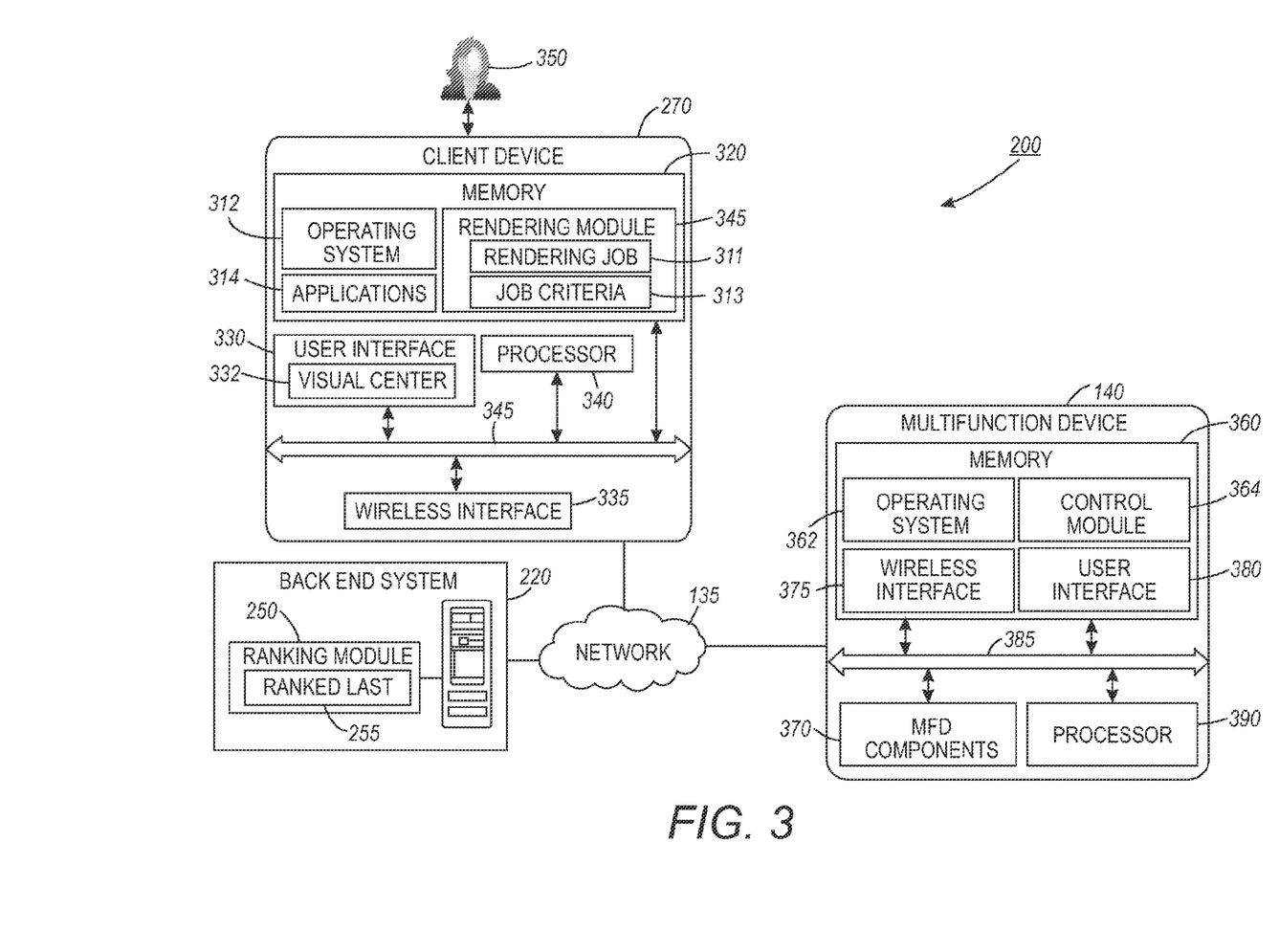
FIG. 3 illustrates a block diagram of the rendering device ranking system, in accordance with the disclosed embodiments.

FIG. 3 illustrates a block diagram of a multi-function device ranking system 300, in accordance with the disclosed embodiments. Note that in FIGS. 1-6, identical or similar blocks are generally indicated by identical reference numerals. The client device 275 associated with the ranking system 200 includes a memory 320, a user interface 330 and a processor 340 coupled to a local interface 345. The local interface 345 can be for example, a data bus with an accompanying control/address bus. A wireless interface 355 facilitates wireless communication with the multifunction device 140 and other wireless devices and/or networks. The memory 320 stores several components that are executable by the processor 340. The components include, for example, an operating system 312, one or more applications 314, and the rendering module 315.

The multifunction device 140 includes a processor circuit having a memory 360, a user interface 380 and a processor 390 coupled to a local interface 385. The interface 330 and 380, which is preferably a graphical user interface (GUI), can serve to display results, whereupon a user 350 may supply additional inputs or terminate a particular session. The memory 360 stores an operating system 362 and a control module 364 that are executable by the processor 390. The multifunction device 140 also includes various MFD components 370 such as motors and mechanical paper path components as well as image creation components. A wireless network interface 375 coupled to the local interface 385 facilitates wireless communication with respect to the multifunction device 140 via the network 135.

The client device 275 can be configured with the rendering module 315 in order to select and transmit the rendering job 311 along with one or more job criteria 313 to the rendering device 140 via the back end system 220. Note that the job criteria 313 with respect to the rendering job 311 includes, such as, for example, finishing options, media quality/size and proximity of the rendering device 140. The rendering device 140 may have one or more print capabilities such as for example, color, media, finishing options, and proximity can be evaluated based on the job criteria 313 in order to generate an 'overall ranking' utilizing the back end system 220. The back end system 220 in association with the ranking module 250 thereby generates a ranked list 255 by sorting the multi-function devices 140 based on the 'overall ranking'. Such ranked list 255 can be displayed in the user interface 330 associated with the client device 275 utilizing a set of visual cues 332 in order to thereafter permit the user 350 to select a best-fit rendering device 140 in a simple and efficient manner. The ranked list 255 with respect to the networked rendering devices 140 can be also displayed in the user interface 380 associated with the rendering device 140 for facilitating print re-direction application in the network 135.

Figure 4:
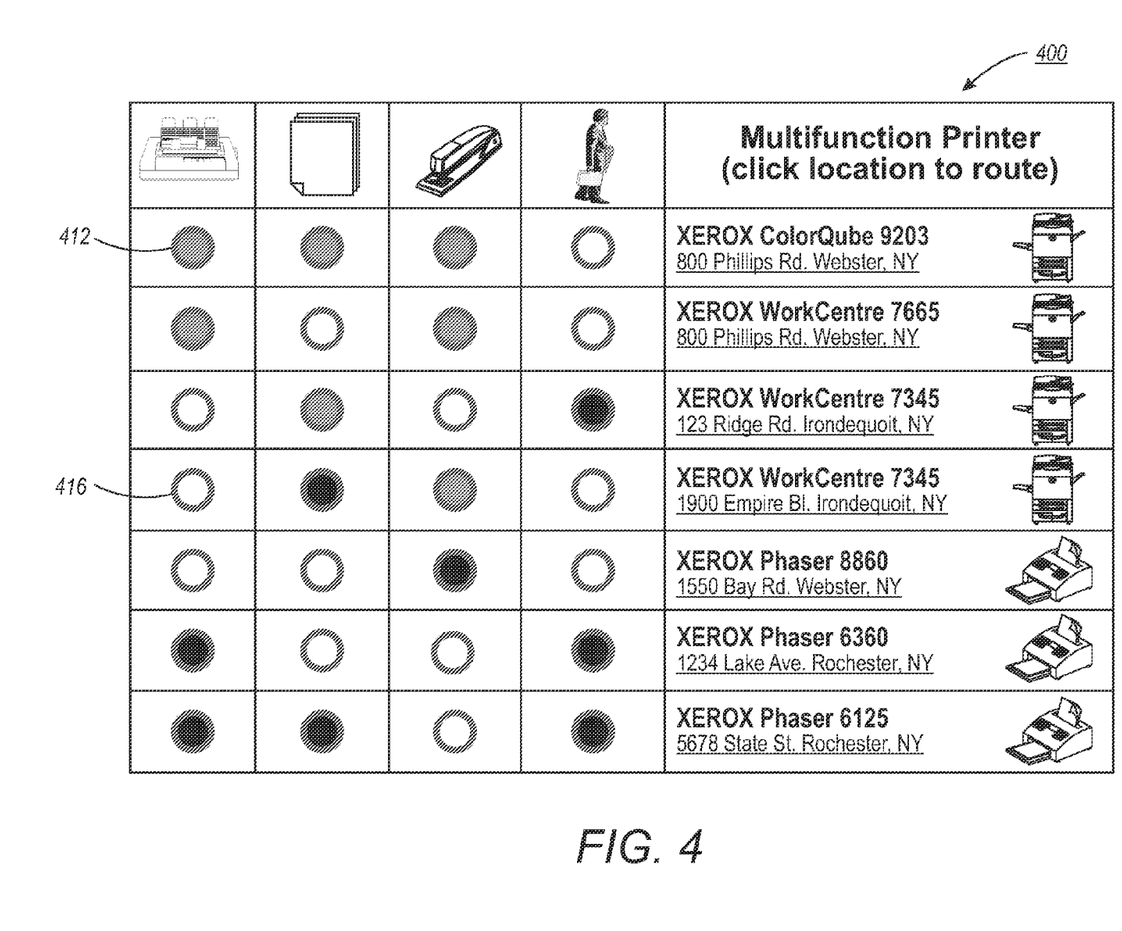
FIG. 4 illustrates a graphical user interface illustrating a ranked list of networked rendering devices utilizing a set of visual cues, in accordance with the disclosed embodiments.

FIG. 4 illustrates a graphical user interface 400 displaying the ranked list 255 of the multi-function device(s) 140 utilizing the visual cues 332, in accordance with the disclosed embodiments. The visual cues 332 with respect to the ranked list 255 can be, for example, a traffic icon 412 that includes one or more traffic lights such as, for example, a green light, a red light and a yellow light for representing the print capabilities with respect to the rendering device 140. The green light associated with the traffic icon 412 typically represents a 'best/better' fit print capability for the job criteria 313. The yellow light represents a 'good/fair' fit print capability for the job criteria 313. Similarly, the red light represents a 'poor/bad' fit print capability for the job criteria 313. Additionally, each row 416 in the ranked list 255 visually indicates a summary of the print capabilities with respect to the rendering device 140 via a color code (e.g. green, yellow and red). Such a representation facilitates the user 350 to easily select a best-fit multi-function device based on the print capabilities.

Figure 5:
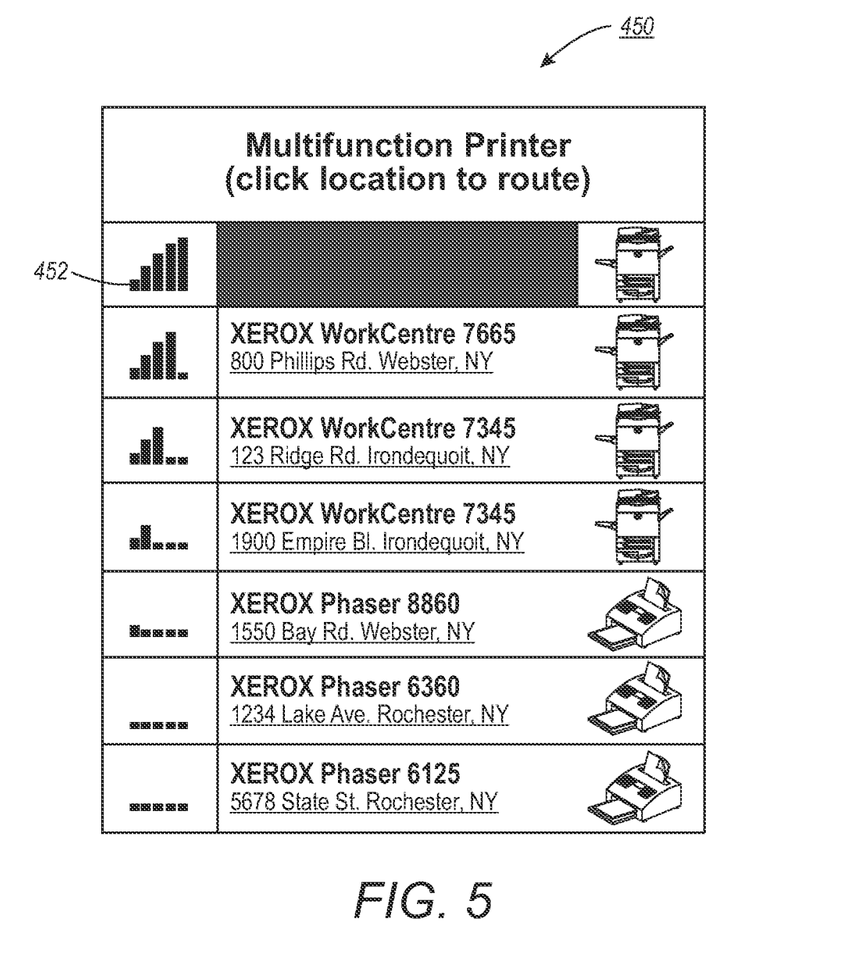
FIG. 5 illustrates a graphical user interface illustrating the ranked list of networked rendering devices utilizing a set of cell phone bars, in accordance with the disclosed embodiments.

FIG. 5 illustrates a graphical user interface 450 illustrating the ranked list 255 of multi-function devices 140 utilizing a set of cell phone bars 452, in accordance with the disclosed embodiments. The ranked list 255 can be alternatively represented with the cell phone bars 452 in order to indicate the compatibility between the rendering device 140 and the rendering job 311 in a mobile application. Such a representation can be utilized in a variety of mobile communication devices, such as, for example, a Smartphone, a personal digital assistant (PDA), a palmtop etc for facilitating a mobile user to select the best-fit multi-function device within the network 135. Note that the ranked list 255 herein should not be interpreted in any limiting manner. However, it will be apparent to those of skilled in the art that other types of representations can be utilized in place of the suggested without departing from the scope of the invention. For example, with respect to the "traffic" light example discussed herein, it can be appreciated that screens may be smaller, may not be in color and may use a motif that is familiar to a user (e.g., a black-and-white cell phone screen).

Figure 6:
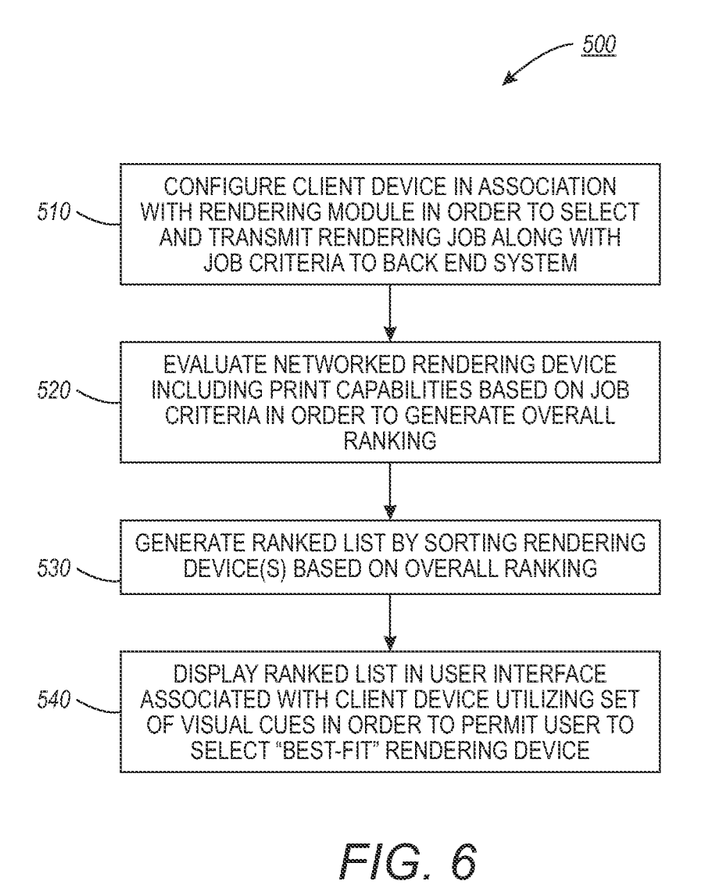
FIG. 6 illustrates a high-level flow chart of operation illustrating logical operational steps of a method for ranking networked rendering devices, in accordance with the disclosed embodiments.

FIG. 6 illustrates a high level flow chart of operation illustrating logical operational steps of a method 500 for ranking the multi-function devices and indicating a best-fit multi-function device in the network, in accordance with the disclosed embodiments. The client device 275 can be configured in association with a rendering module 315 in order to select and transmit the rendering job 311 along with the job criteria 313 to the back end system 220, as illustrated at block 510. The networked rendering device 140 including the print capabilities can be thereafter evaluated based on the job criteria 313 in order to generate the 'overall ranking', as depicted at block 520. The ranked list 255 can be further generated by sorting the multi-function devices 140 based on the 'overall ranking', as indicated at block 530. Such a ranked list 255 can be displayed in the user interface 330 associated with the client device 275 utilizing one or more of the visual cues 332 in order to thereafter permit the user 350 to select the best-fit rendering device 140 in a simple and efficient manner, as shown at block 540. Such a system and method thereby facilities the user to select the best-fit networked rendering device from the ranked list of rendering devices based on the rendering job criteria.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for ranking a networked rendering device, comprising:
    configuring a client device in association with a rendering application to thereafter select and transmit a rendering job along with at least one job criteria from said client device to at least one network rendering device;
    evaluating said at least one network rendering device having a plurality of print capabilities based on said at least one job criteria to thereafter generate an overall ranking with respect to said at least one network rendering device, wherein said at least one print capability includes at least two of the following types of print capability: a color, a media type, a finishing option, and a proximity;
    visually indicating compatibility between said at least one network rendering device and the rendering job by visually representing a best-fit print capability with respect to said at least one network rendering device; and
    generating a ranked list by sorting said at least one network rendering device based on said overall ranking and displaying said ranked list in a user interface associated with said client device utilizing a set of visual cues comprising cell phone bars, wherein a greater number of bars indicates strong compatibility between said rendering job associated with said client device and said rendering device and selecting a best-fit rendering device based on said ranked list.

2. The method of claim 1 further comprising displaying said ranked list in said user interface associated with said at least one rendering device for facilitating a print re-direction application.

3. The method of claim 1 further comprising formatting and transmitting said rendering job to said best-fit rendering device via a web service print mechanism.

4. The method of claim 1 further comprising selecting and transmitting said rendering job along with said at least one job criteria from said client device to said at least one network rendering device via a back end system.

5. The method of claim 4 further comprising automatically generating said overall ranking with respect to said at least one network rendering device utilizing said back end system.

6. The method of claim 4 further comprising formatting and transmitting said rendering job from said back end system to said best-fit rendering device via a web service print mechanism.

7. A system for ranking a networked rendering device, comprising:
    a processor;
    a data bus coupled to said processor; and
    a computer-usable medium embodying computer code, said computer-usable medium being coupled to said data bus, said computer program code comprising instructions executable by said processor and configured for:
        configuring a client device in association with a rendering application to thereafter select and transmit a rendering job along with at least one job criteria from said client device to at least one network rendering device;
        evaluating said at least one network rendering device having a plurality of print capabilities based on said at least one job criteria to thereafter generate an overall ranking with respect to said at least one network rendering device, wherein said at least one print capability includes at least two of the following types of print capability: a color, a media type, a finishing option, and proximity;
        visually indicating compatibility between said at least one network rendering device and the rendering job by visually representing a best-fit print capability with respect to said at least one network rendering device; and
        generating a ranked list by sorting said at least one network rendering device based on said overall ranking and displaying said ranked list in a user interface associated with said client device utilizing a set of visual cues comprising cell phone bars, wherein a greater number of bars indicates strong compatibility between said rendering job associated with said client device and said rendering device and selecting a best-fit rendering device based on said ranked list.

8. The system of claim 7 wherein said instructions are further configured for displaying said ranked list in said user interface associated with said at least one network rendering device for facilitating a print re-direction application.

9. The system of claim 7 wherein said instructions are further configured for formatting and transmitting said rendering job to said best-fit rendering device via a web service print mechanism.

10. The system of claim 7 wherein said instructions are further configured for selecting and transmitting said rendering job along with said at least one job criteria from said client device to said at least one network rendering device via a back end system.

11. The system of claim 10 wherein said instructions are further configured for automatically generating said overall ranking with respect to said at least one network rendering device utilizing said back end system.

12. The system of claim 10 wherein said instructions are further configured for formatting and transmitting said rendering job from said back end system to said best-fit rendering device via a web service print mechanism.

13. A non-transitory computer-usable device for storing computer program code for ranking a networked rendering device, said computer program code comprising program instructions executable by a processor, said program instructions comprising:

program instructions to configure a client device in association with a rendering application to thereafter select and transmit a rendering job along with at least one job criteria from said client device to at least one network rendering device;

program instructions to evaluate said at least one network rendering device having a plurality of print capabilities based on said at least one job criteria to thereafter generate an overall ranking with respect to said at least one network rendering device, wherein said at least one print capability includes at least two of the following types of print capability: a color, a media type, a finishing option, and proximity;

program instructions to visually indicate compatibility between said at least one network rendering device and the rendering job by visually representing a best-fit print capability with respect to said at least one network rendering device; and program instructions to generate a ranked list by sorting said at least one network rendering device based on said overall ranking and displaying said ranked list in a user interface associated with said client device utilizing a set of visual cues comprising cell phone bars, wherein a greater number of bars indicates strong compatibility between said rendering job associated with said client device and said rendering device and selecting a best-fit rendering device based on said ranked list.

14. The non-transitory computer-usable device of claim 13 wherein said program instructions further comprise program instructions to display said ranked list in said user interface associated with said at least one network rendering device for facilitating a print re-direction application.

15. The non-transitory computer-usable device of claim 13 wherein said program instructions further comprise program instructions to format and transmit said rendering job to said best-fit rendering device via a web service print mechanism.

* * * * *